No. 870,247. PATENTED NOV. 5, 1907.
J. NIXON.
CORN HARVESTER.
APPLICATION FILED NOV. 6, 1906.
3 SHEETS—SHEET 1.
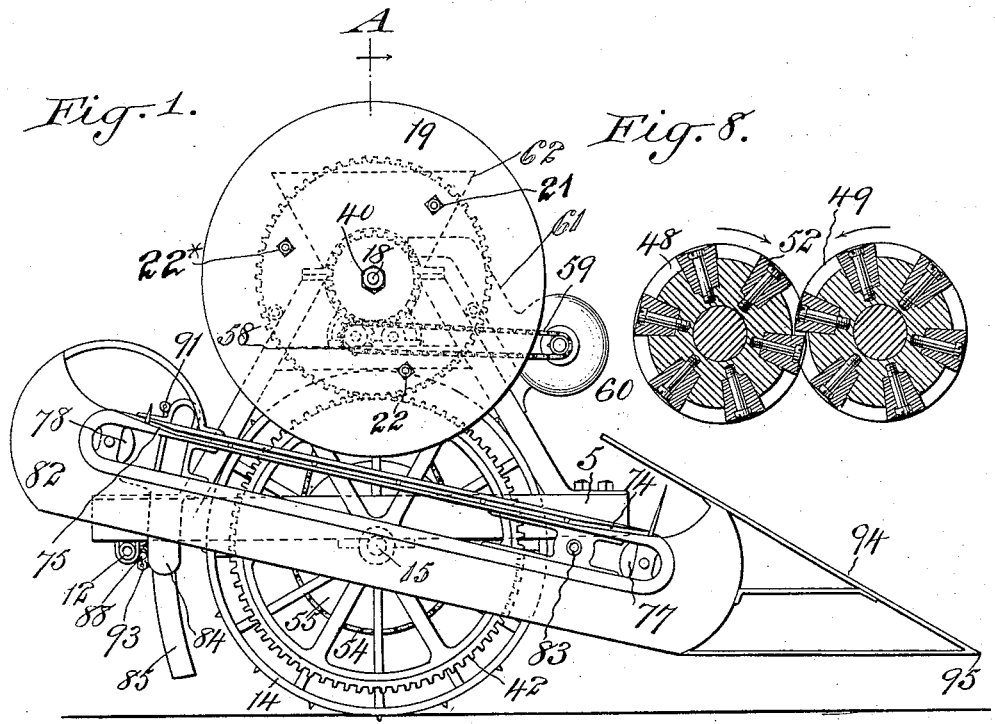
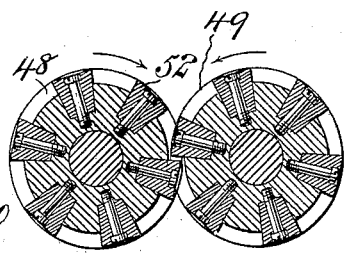
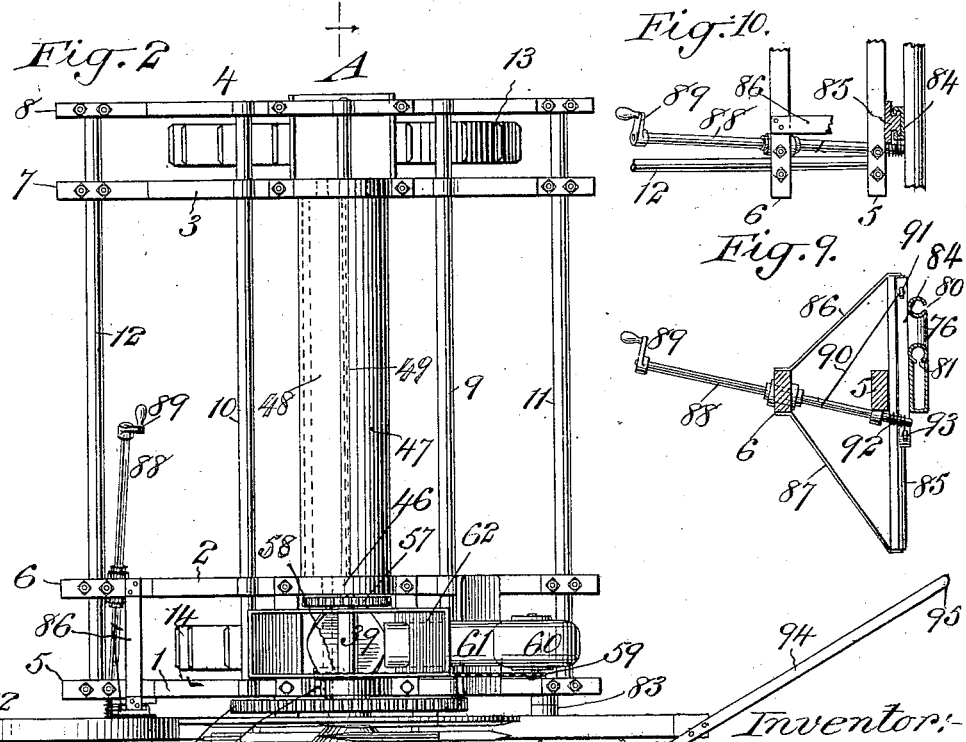
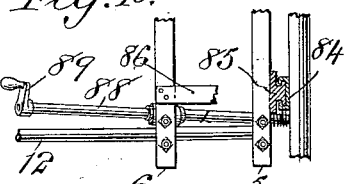
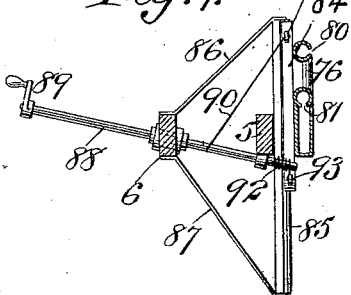

No. 870,247. PATENTED NOV. 5, 1907.
J. NIXON.
CORN HARVESTER.
APPLICATION FILED NOV. 6, 1906.

3 SHEETS—SHEET 2.

Witnesses:—
F. George Barry,
Henry Thieme.

Inventor:—
Jacob Nixon
by attorneys

No. 870,247. PATENTED NOV. 5, 1907.
J. NIXON.
CORN HARVESTER.
APPLICATION FILED NOV. 6, 1906.
3 SHEETS—SHEET 3.
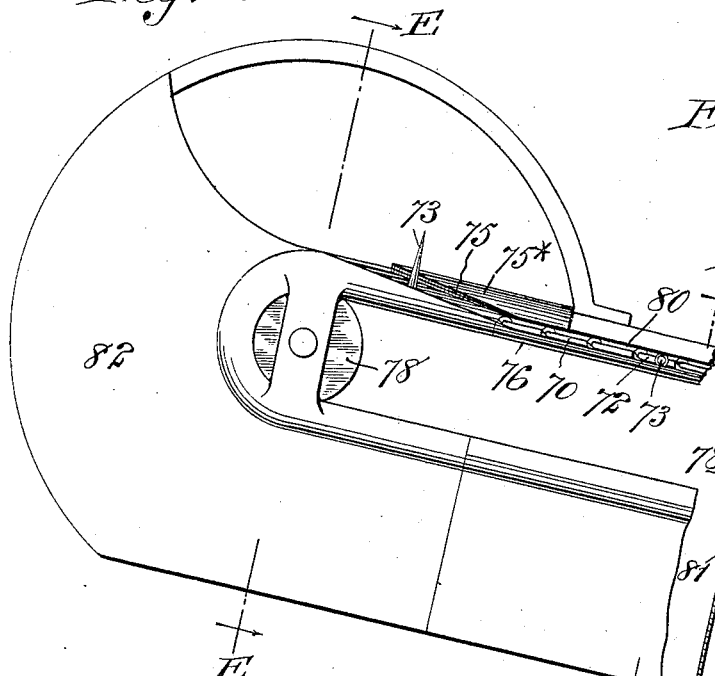
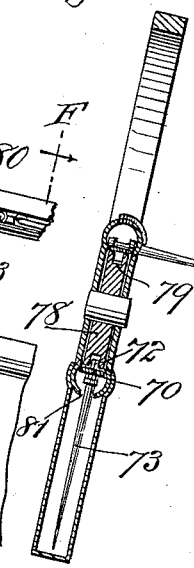
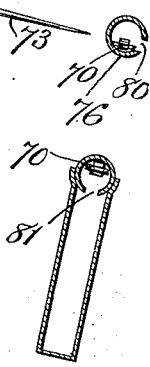
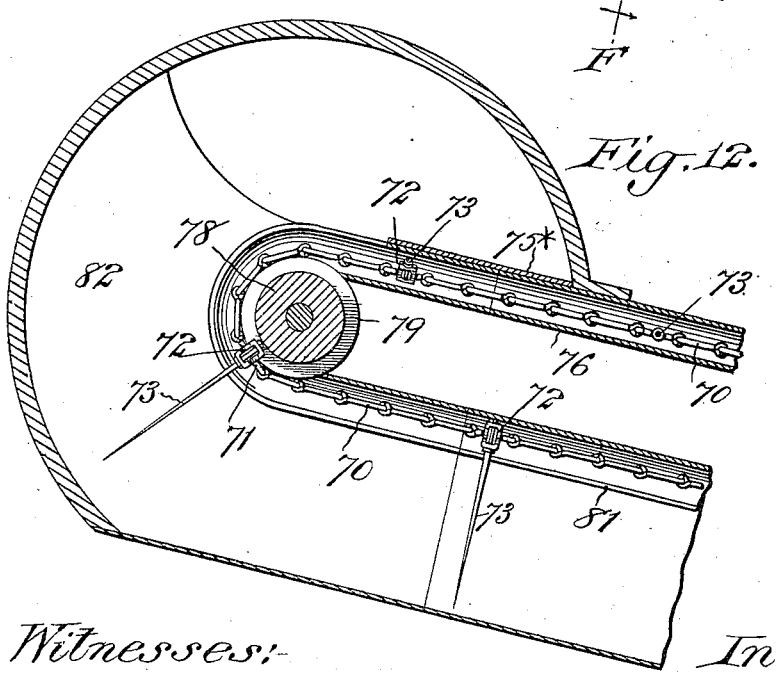
Witnesses:
F. George Barry,
Henry Thieme.
Inventor:
Jacob Nixon
by attorneys
Brown Seward

UNITED STATES PATENT OFFICE.

JACOB NIXON, OF STOCKPORT, IOWA.

CORN-HARVESTER.

No. 870,247.        Specification of Letters Patent.        Patented Nov. 5, 1907.

Application filed November 6, 1906. Serial No. 342,184.

*To all whom it may concern:*

Be it known that I, JACOB NIXON, a citizen of the United States, and a resident of Stockport, in the county of Van Buren and State of Iowa, have invented a new and useful Corn-Harvester, of which the following is a specification.

My invention relates to a corn harvester with the object in view of providing a machine that will be simple, effective and durable and which will serve to strip the ears of corn from the stalks and deposit them freed from their husks into a suitable receptacle for removal.

With these ends in view, my invention consists in certain features of construction and combination of parts as will be hereinafter described and pointed out in the claims.

Figure 5:
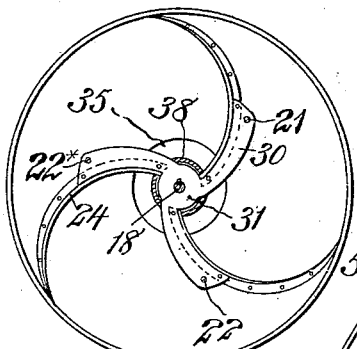
Figure 4:
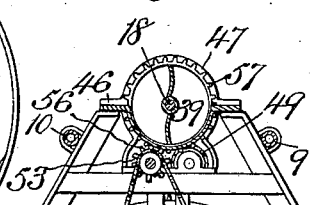
Figure 6:
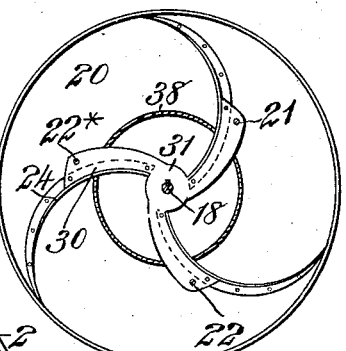
Figure 7:
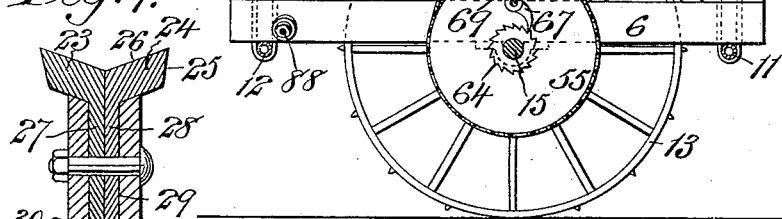
Figure 3:
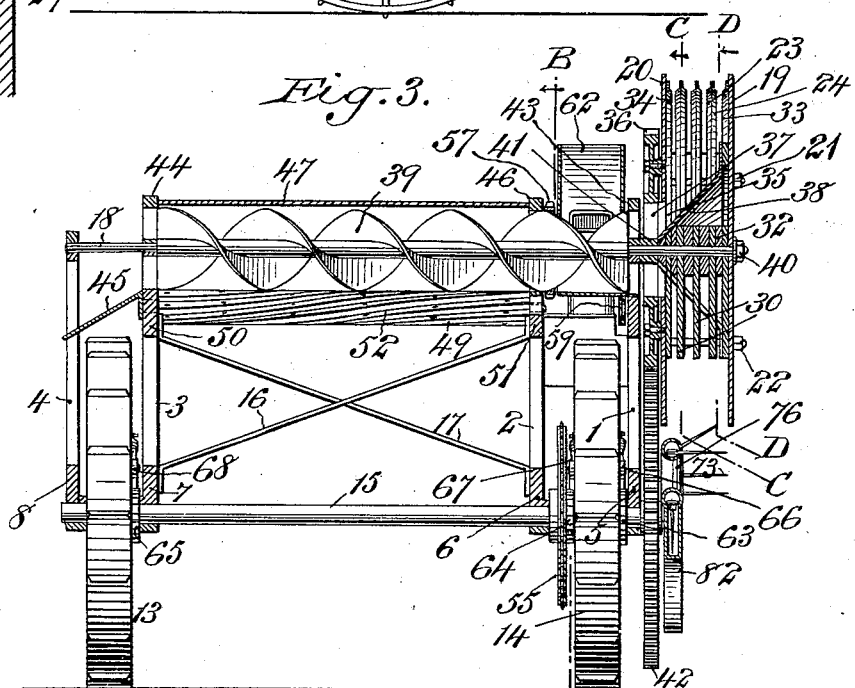

A practical embodiment of my invention is represented in the accompanying drawings, in which Figure 1 is a view of the harvester in side elevation, Fig. 2 is a top plan view, Fig. 3 is a transverse section in the plane of the line A—A of Fig. 1, Fig. 4 is a longitudinal section in the plane of the line B—B of Fig. 3, Fig. 5 is a section in detail in the plane of the line C—C of Fig. 3, Fig. 6 is a section in detail in the plane of the line D—D of Fig. 3, Fig. 7 is a partial section on an enlarged scale through one of the strippers and its supporting arm, Fig. 8 is an enlarged transverse section through the husking rolls, Fig. 9 is a view in detail, partly in section, showing the means for elevating and lowering the finger reel and its attachments, Fig. 10 is a top plan view of the same, Fig. 11 is an enlarged partial view in side elevation of the chain reel and its casing, Fig. 12 is a view of the same in vertical longitudinal section, Fig. 13 is a view in transverse section in the plane of the line E—E of Fig. 11, and Fig. 14 is a transverse section in the plane of the line F—F of Fig. 11.

The main frame of the harvester comprises four upright frames denoted, respectively, by 1, 2, 3 and 4, bolted to and uprising respectively from four sills denoted by 5, 6, 7 and 8, the several frames and sills being united by cross braces denoted, respectively, by 9, 10, 11 and 12. This frame is mounted on a pair of traction wheels 13, 14, on an axle 15 journaled in suitable bearings to the sills 5 to 8 inclusive. The uprising frames 2 and 3 are further supported and strengthened by diagonal braces 16, 17, (see Fig. 3).

Above the traction wheels, a shaft 18 is journaled in suitable bearings in the frames 1 to 4 inclusive and said shaft projecting at one end beyond the traction wheel and having secured thereto the stripper mechanism, as follows:—An outer disk 19 and an inner disk 20 are held spaced a suitable distance apart by bolts 21, 22, 22*. These disks 19 and 20 are centered on the shaft 18 and fixed to rotate therewith and have located between them the stripper arms shown in side elevation in Figs. 5 and 6, and in enlarged cross sectional detail in Fig. 7. The number of these stripper arms in the present case is three on each hub and in a single plane and the number of such groups of arms is in the present instance three together with half groups attached to the inner faces of the disks 19 and 20 but the number of groups of arms may be increased or diminished at pleasure as circumstances may require.

As the arms are quite similar in structure, a description of one will suffice for all.

The arms are formed of two symmetrical curved plates denoted, respectively, by 23 and 24, each having two shearing edges, one denoted by 25 set at an angle of ten degrees (10°) more or less to the vertical plane and the other, 26, at an angle of forty degrees (40°) more or less to the vertical plane, the said parts 23 and 24 being further provided with flanges 27, 28, which are intended to lie in close proximity to each other as shown in Fig. 7, forming an open V between the outer shearing edges. These arms are held in suitable grooves 29 formed in short arms 30 fixed to and projecting from a hub 31. The general shape of the arms is curved in the vertical plane of the group of the arms forming an open pocket in the advance face of the arm for engaging the ear of corn and drawing it from the stalks. These groups of arms are mounted on the shaft 18 and spaced apart by blocks 32 interposed between their hubs, the said blocks 32 being removable and exchangeable for blocks of varying thicknesses to make the spaces between the groups of arms greater or less as may be required for effective work.

In addition to the arms as above described, there is a group of half arms, *i. e.*, arms consisting of one of the two sections 23 or 24, instead of the two united sections 23 and 24, one of the said groups of half arms, denoted by 33, being made fast to the inner face of the outer disk 19 and the other group of half arms denoted by 34 being made fast to the outer face of the inner disk 20. It is intended that these half section arms which are made fast to the disks should be made to correspond to the full arms which are spaced apart and located between the disks. The inner disk 20 is further provided with a central opening 35 and has fixed thereto a gear wheel 36 concentric with the shaft 18 and having an open center 37 corresponding to the opening 35 in the disk 20.

A cone 38 tapers from the outer disk 19 to the shaft 18 within the opening 35 in the inner disk 20 for the purpose of directing the ears of corn which are gathered by the stripping arms to and through the opening 35 in the disk 20 and through the opening 37 in the gear wheel 36 into engagement with the screw conveyer 39 mounted loosely on the shaft 18.

The several groups of stripper arms and the disks to which they are attached are held firmly together and to the shaft by means of a nut 40 on the outer end of the shaft which forces the parts mounted on the shaft toward a hub 41 fixed on the shaft in the plane of gear wheel 36. The several arms to which the stripper arms are attached pass from the hubs on the shaft 18 through the wall of the cone 38 as clearly shown in Figs. 5 and 6. The gear wheel 36 intermeshes with a driving gear wheel 42 fixed on the axle 15 to rotate with the traction wheels and this train of gear serves to rotate the disks 19 and 20 and their contained stripper arms independently of the rotation of the conveyer 39.

The conveyer 39 has at its ends, circular rings 43, 44, the interior openings in which corresponds to the diameter of the conveyer, the ring 43 being set on the top of the upright frame 1 and forming a closure of the space between the end of the conveyer and the interior opening 37 in the gear wheel 36 while the ring 44 is set on the upright frame 3 and through it the husked ears of corn are discharged onto the inclined chute 45 to be received by a suitable receptacle, not shown, for removing the corn from the machine. There is also a circular ring 46 set on top of the upright frame 2 and in alinement with the rings 43 and 44 and between these rings 44 and 46 there is fixed a casing 47 of the form clearly shown in Fig. 4, for housing the conveyer and also the husking rolls 48, 49, (see Fig. 8) mounted in proximity to and below the conveyer 39.

The husking rolls are mounted in suitable bearing in stringers 50, 51, connecting the parts, respectively, of the upright frames 3 and 2 and are provided with spiral teeth 52 which interengage, as clearly shown in Fig. 8, to strip the husks from the ears of corn as they are being conveyed along by the conveyer 39. One of these husking rolls, in the present instance the roll 48, has its shaft extended across the space between the upright frames 1 and 2 and is provided with a sprocket pinion 53 connected by a chain 54 with a driving sprocket wheel 55 fixed to rotate with the axle 15. This serves to drive the roller 48 and this in turn drives its companion roller 49. This extended shaft of the roller 48 also has thereon a driving pinion 56 which intermeshes with a spur wheel 57 fixed to the conveyer and this serves to drive the conveyer at a much slower speed than the husking rolls are driven at as the pinion 56 is much smaller than the gear wheel 57. This same extended portion of the shaft of the roller 48 also serves to drive the blower, a sprocket wheel 58 thereon being connected by a chain 59 with the shaft of a blower, indicated at 60, the blower being of any well known or approved form. The air discharge conduit 61 from this blower leads to and through the wall of a hopper 62 set intermediate of the uprights 1 and 2 over the end of the conveyer and in proximity to the ring 43 so that a blast of air may be maintained at the point where the ears, stripped from the stalks first enter the conveyer to blow out any loose husk, stalk or foreign matter that may tend to impede and clog the machine.

The traction wheels 13, 14, are loosely mounted on the shaft 15 and are arranged to drive the shaft 15 when they move forward but to rotate idly on the shaft when they move backward. This is accomplished by means of several ratchet wheels 63, 64, and 65, fixed on the shaft in proximity to the opposite sides of the traction wheel 14 and in proximity to the traction wheel 13, which are engaged by suitable spring actuated pawls 66, 67 and 68, respectively. One of these ratchet wheels and pawls, viz; 64 and 67 are shown in side elevation in Fig. 4, and the spring for actuating the pawl 67 is shown at 69, Fig. 4, it being understood that the other pawls have similar springs for holding them in engagement with their respective ratchets as the traction wheels rotate.

For supporting the stalks in an upright position and steadying them during the operation of the strippers, I provide a reel consisting of an endless chain with fingers radiating therefrom suitably supported at the side of the traction wheel where the fingers will reach out horizontally underneath the strippers.

The endless chain for carrying the fingers is denoted by 70 and consists of a series of interlocking links intercepted at intervals by a swivel link 71 capable of rocking in a plane at right angles to the chain 70 and consisting of a central loop 72 interposed between and pivoted to the parts of the link 71. The loop 72 forms a support for the finger 73 which passes through the opposite ends of the loop and is fixed therein. The fingers 73 are located at such intervals as will suffice to steady the stalks and are turned from the vertical idle position into the horizontal operative position and from the horizontal into a vertical plane by means of diagonal slots 74, 75, located respectively in proximity to the forward and rear ends of the pipe track 76 along which the chain travels. These diagonal slots are reinforced by hard steel facing pieces 75* to prevent wear. The chain at its opposite ends travels over idle pulleys, the one at the front end being denoted by 77 and the one at the rear end by 78, these pulleys being provided with annular grooves 79 for the reception of the inner ends of the loops 72 which carry the fingers 73 when the latter are thrown into the vertical plane of the track.

The pipe track 76 is provided intermediate of the diagonal slots 74 and 75 with a horizontal slot 80 along which the fingers travel in a horizontal position, as clearly shown in Fig. 13, and with a vertical slot 81 extending around the outer portions of the idle pulleys and along the lower part of the pipe track.

The pipe track with its chain carrying pulleys and fingered chain is mounted in a casing 82, the latter being narrow and hollow for protecting the fingers as they pass in vertical position from rear to the front along the bottom part of the pipe track, the said casing being pivotally secured at 83 to the sill 5 of the machine and capable of being elevated and depressed on this pivot by a lifting and lowering mechanism at the rear end of the casing, as follows:—The casing is provided with an undercut segment 84 (see Figs. 9 and 10) which slides up and down on a T-tongue 85 fixed to the sill 5 and braced by means of braces 86, 87, to the sill 6. The raising and lowering of the rear end of the reel track is accomplished by means of the crank shaft 88 provided with a crank 89, the shaft being journaled in suitable bearings in the sills 5 and 6, and having secured thereto a flexible connection 90 which leads from it to a point of attachment 91 near the upper end of the undercut segment and a second flexible connection 92 leading from the crank shaft 88 to a point of attachment 93 near the lower end of the undercut segment so that when the crank shaft 88 is turned in one direction it will wind up on the flexible connection 92 and lift the rear end of the track, the connection 90 unwinding from the shaft and when the crank shaft 88 is turned in the opposite direction it will wind up on the connection 90 and unwind the connection 92 lowering the rear end of the track.

At the front end of the track casing 82 I locate a lifting and alining frame 94 which extends obliquely inwardly from the front of the casing 82 to the point 95 of the frame, the top of the frame at the same time extending downwardly to meet the base line forming, in effect, a plow shaped frame, the nose of which will pass under the fallen or leaning stalks of corn as the machine moves along the row and gradually raise them into an upright position and crowd them outwardly into position to be engaged by the strippers.

In operation, as the machine is drawn along with the traction wheel near the row of corn and the strippers directly over the row of corn, the alined corn stalks will be brought into position underneath the gang of strippers and the ears as they one after another enter between the disks 19 and 20 under the natural rebound from the pressure exerted on them by the stripper casing will be gathered on the concave faces of the strippers and sheared from the stalks and carried upwardly until they slide by gravity down along the upper face of the central cone within the gang of strippers into the end of the screw conveyer and by this conveyer they will be moved along toward the opposite side of the machine and while being so moved along by the screw conveyer they will be operated upon by the spiral surface husking rolls and their husks will be stripped from the ear and the corn finally freed from the husk and silk will be slid out of the end of the conveyer casing onto the chute to be collected by any suitable receptacle for removing it from the field. As the corn slides down the surface of the cone to the conveyer, it will be met by a blast of air from the blower which will free it from all loose leaf husk and foreign material before it reaches a point where the operation of husking begins. As the machine moves along the row, the horizontal fingers of the endless chain reel will press against the upright stalks and hold them steadily in position with sufficient firmness to enable the gang of strippers to do their work. The forward movement of the machine and the obstruction of the standing stalks to the horizontal fingers of the reel, will cause the fingers of the reel to travel rearwardly and as they approach the rear end of the reel, they will be thrown into the vertical plane of the endless chain and so held while traveling in a downwardly pointing direction along to the front of the reel casing where, after passing upwardly around the outer portion of the idle pulley, they will be again forced into a horizontal position by the diagonal slot in the pipe track at the forward end and will then begin their work as a stalk supporting device.

It is obvious that changes might be resorted to in the form and arrangement of the several parts without departing from the spirit and scope of my invention; hence I do not wish to limit myself strictly to the structure herein shown and described, but

What I claim is:—

1. A corn harvester comprising curved stripper arms arranged in a gang and provided with cutting edges, means for supporting the gang of curved stripper arms in operative position, means for rotating the gang of strippers and means for directing the stripped product away from the arms toward the side of the harvester.

2. A corn harvester comprising curved sectional stripper arms arranged in a gang and provided with cutting edges, means for supporting the gang of curved stripper arms in operative position, means for rotating the gang of strippers and means for directing the stripped product away from the arms toward the side of the harvester.

3. A corn harvester comprising curved stripper arms arranged in a gang, means for supporting the gang of curved stripper arms in operative position, means for rotating the gang of strippers and a central cone within the gang of strippers for directing the stripped product away from the arms toward the side of the harvester.

4. A corn harvester comprising curved stripper arms, arranged in a gang, each arm provided with one left hand and one right hand cutting-edge, means for supporting the gang of curved stripper arms in operative position, means for rotating the gang of strippers and means for directing the stripped product away from the arm toward the side of the harvester.

5. A corn harvester comprising curved stripper arms, arranged in gangs, each arm provided with one left hand and one right hand cutting-edge, and provided with firmly united flanges for holding their cutting edges at angles of ten to forty degrees to their vertical plane respectively, means for supporting the gang of curved stripper arms in operative position, means for rotating the gang of strippers and means for directing the stripped product away from the arm toward the side of the harvester.

6. A corn harvester comprising a shaft, curved stripper arms arranged in gangs and radiating from hubs on the shaft, the gangs being adjustable longitudinally along the shaft, said arms being each composed of a base section extending from the hub and an operating section fixed in the base section, means for operating the arms and means for directing the product away from within the arms toward the side of the harvester.

7. A corn harvester comprising a shaft, curved stripper arms arranged in gangs, means for adjusting the gangs longitudinally along the shaft, a casing comprising outer and inner walls and half arm sections fixed to the outer and inner walls of the casing to correspond with the arms arranged in gangs within the casing, means for rotating the arms and means for delivering the product away from within the casing toward the side of the harvester.

8. A corn harvester comprising a shaft, stripper arms arranged in gangs, the gangs being adjustable longitudinally along the shaft, a casing comprising outer and inner walls connected by bolts, the inner wall being provided with a central opening, means for rotating the stripper arms and means for directing the product through the opening in the inner wall toward the side of the harvester.

9. A corn harvester comprising curved arms arranged in gangs, a shaft on which the arms are mounted, interchangeable spacing blocks between the gangs of arms on the shaft, means for rotating the shaft and hence the arms and means for delivering the product from within the arms toward the side of the harvester.

10. A corn harvester comprising stripper arms arranged in gangs, a casing surrounding the arms, spur gear secured to the casing, traction wheels, gears connecting the traction wheels, with the spur gear, for rotating the arms and means for delivering the product from within the curved arm casing toward the side of the harvester.

11. A corn harvester comprising stripper arms arranged in gangs, a shaft on which the stripper arms are mounted, means for rotating the shaft, a screw conveyer mounted loosely on the shaft, means for driving the screw conveyer independently of the stripper arms and means for directing the product from the arms to the screw conveyer.

12. A corn harvester comprising stripper arms, means for rotating them, a screw conveyer, means for directing the product from the stripper arms to the screw conveyer and husking rolls mounted in position to operate on the product while it is being advanced by the screw conveyer.

13. A corn harvester comprising stripper arms, means for rotating them, a screw conveyer, means for directing the product from the stripper arms to the screw conveyer, husking rolls located beneath the screw conveyer and a casing common to the screw conveyer and husking rolls.

14. A corn harvester comprising stripper arms, means for rotating them, a screw conveyer, means for directing the product from the arms to the screw conveyer, husking rolls in proximity to the screw conveyer, gears for connecting one of the husking rolls with the spiral conveyer and means for rotating the rolls and hence the conveyer.

15. A corn harvester comprising stripper arms, means for rotating them, a screw conveyer, means for directing the product from the arms to the conveyer, traction wheels for supporting the arms and conveyer, husking rolls in proximity to the conveyer, a sprocket gear from the drive wheel to one of the husking rolls and gears connecting the husking roll with the conveyer.

16. A corn harvester comprising four upright frames, cross braces connecting the four uprights, a shaft supported in the uprights, stripper arms carried on the projecting end of the shaft, a screw conveyer mounted on the shaft, means for rotating the shaft and hence the stripper arms, independent means for rotating the screw conveyer and means for directing the product from the stripper arms to the conveyer.

17. A corn harvester comprising stripper arms, means for rotating the arms, a traveling support for holding the stalks in position to be operated on, said support comprising an endless chain provided with pivoted fingers and means for mounting the support in position to engage the stalks as the harvester travels along a row.

18. A corn harvester comprising stripper arms, means for rotating them, a traveling support comprising an endless chain provided with pivoted fingers for engaging the stalks and means for mounting the traveling support in vertically swinging adjustment.

19. A corn harvester comprising stripper arms, means for rotating the arms, a traveling support consisting of an endless chain provided with pivoted fingers and a slotted pipe track for supporting the chain and adjusting the fingers.

20. A corn harvester comprising stripper arms, means for rotating the arms, a traveling support consisting of an endless chain provided with fingers arranged to swing laterally thereon and a pipe track for the support, the said track being provided with diagonal slots for directing the fingers from upright to horizontal and horizontal to upright as they travel along the track.

21. A corn harvester comprising stripper arms, means for rotating the arms, a traveling support consisting of an endless chain provided with pivoted fingers and a pipe track along which the chain travels, the said track being provided with reinforced diagonal slots for adjusting the fingers.

22. A corn harvester comprising stripper arms, means for rotating the arms, a traveling support, a casing for supporting the traveling support, means for pivoting the casing to the frame of the harvester and means for raising and lowering the casing and hence the traveling support toward and away from the stripper arms, at pleasure.

23. A corn harvester comprising stripper arms, means for rotating the arms, an endless chain support provided with pivoted fingers, a track for carrying the chain and grooved idle pulleys for supporting the chain at opposite ends of the track.

24. A corn harvester comprising stripper arms, means for rotating the arms, a traveling support arranged to operate in conjunction with the stripper arms, said support comprising an endless chain provided at intervals with a swivel link, fingers mounted in the swivel links to turn laterally with respect to the travel of the chain and means for directing the adjustment of the fingers from vertical to horizontal and horizontal to vertical as the harvester moves along.

25. A corn harvester comprising stripper arms, means for rotating the arms, a traveling support arranged to operate in conjunction with the stripper arms and comprising an endless chain having fingers pivoted to swing laterally with respect thereto and a casing for protecting the fingers during their forward or return movement.

26. A corn harvester comprising stripper arms, means for rotating the arms, traveling support arranged to operate in conjunction with the arms, and a lifting and alining frame attached to the support frame for lifting and alining the stalks in advance of the said traveling support.

27. A corn harvester comprising stripper arms, means for rotating the arms, means for directing the product away from the arms, a blower arranged to act upon the product as it leaves the arms and means for operating the blower.

28. A corn harvester comprising stripper arms, means for rotating the arms, a screw conveyer, means for directing the product from the arms to the conveyer and husking rolls arranged to engage the product while being carried along by the conveyer, the said rolls having spiral teeth extending along their peripheries.

In testimony, that I claim the foregoing as my invention, I have signed my name in presence of two witnesses, this second day of November, 1906.

JACOB NIXON.

Witnesses:
A. R. HIATT,
MAX RAFFAUF.